US011176508B2

(12) United States Patent
Hwang et al.

(10) Patent No.: US 11,176,508 B2
(45) Date of Patent: Nov. 16, 2021

(54) MINIMIZING COMPLIANCE RISK USING MACHINE LEARNING TECHNIQUES

(71) Applicant: International Business Machines Corporation, Armonk, NY (US)

(72) Inventors: Jinho Hwang, Ossining, NY (US); Constantin M. Adam, Fairfield, CT (US); Muhammed Fatih Bulut, New York, NY (US); Milton H. Hernandez, Tenafly, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/299,421

(22) Filed: Mar. 12, 2019

(65) Prior Publication Data

US 2020/0293970 A1    Sep. 17, 2020

(51) Int. Cl.
  *G06Q 10/06*    (2012.01)
  *G06N 20/00*    (2019.01)
  *G06K 9/62*     (2006.01)

(52) U.S. Cl.
  CPC ..... *G06Q 10/06375* (2013.01); *G06K 9/6264* (2013.01); *G06N 20/00* (2019.01); *G06Q 10/0635* (2013.01); *G06Q 10/06393* (2013.01)

(58) Field of Classification Search
  CPC ......... G06Q 10/06375; G06Q 10/0635; G06Q 10/06393; G06N 20/00; G06K 9/6264
  USPC ...................................................... 705/7.37
  See application file for complete search history.

(56) References Cited

U.S. PATENT DOCUMENTS

| 2007/0101432 | A1  | 5/2007  | Carpenter   |             |
|--------------|-----|---------|-------------|-------------|
| 2008/0033775 | A1* | 2/2008  | Dawson      | G06Q 10/0635 |
|              |     |         |             | 705/7.28    |
| 2010/0114634 | A1* | 5/2010  | Christiansen | G06Q 30/018 |
|              |     |         |             | 705/7.28    |
| 2011/0289588 | A1  | 11/2011 | Sahai et al. |            |
| 2015/0142707 | A1* | 5/2015  | Charif      | G06N 20/00  |
|              |     |         |             | 706/12      |

(Continued)

FOREIGN PATENT DOCUMENTS

WO    2015105486    7/2015

OTHER PUBLICATIONS

Junfeng Xie, "A Survey of Machine Learning Techniques Applied to Software Defined Networking (SDN): Research Issues and Challenges", IEEE Communications Surveys & Tutorials, vol. 21, No. 1, First Quarter 2019 (Year: 2018).*

(Continued)

*Primary Examiner* — Jonathan G Sterrett
*Assistant Examiner* — Abdallah A El-Hage Hassan
(74) *Attorney, Agent, or Firm* — Lieberman & Brandsdorfer, LLC

(57) ABSTRACT

Embodiments relate to an intelligent computer platform to utilize machine learning techniques to minimize compliance risk. Data, collected from a plurality of sources is subject to analysis and correlation to assess impact across data points. The assessment measures impact between at least two different compliance domains, facilitates understanding of cross-impact between compliance domains, and provides an estimation of compliance risk. A recommendation plan for one or more new compliance activities is created and dynamically subject to a machine learning reinforcement algorithm.

24 Claims, 7 Drawing Sheets

(56) References Cited

U.S. PATENT DOCUMENTS

| | | | |
|---|---|---|---|
| 2015/0281287 A1* | 10/2015 | Gill | H04L 63/20 726/1 |
| 2016/0196445 A1* | 7/2016 | Allen | H04L 67/1097 726/26 |
| 2016/0224911 A1* | 8/2016 | Rush | G06Q 10/0635 |
| 2017/0017912 A1* | 1/2017 | Teraguchi | G06Q 10/0635 |
| 2017/0091459 A1 | 3/2017 | Childress et al. | |
| 2018/0018602 A1* | 1/2018 | DiMaggio | G06N 20/00 |
| 2018/0181483 A1* | 6/2018 | Oberle | G06F 11/3604 |
| 2018/0189797 A1* | 7/2018 | Ravi | G06F 21/552 |
| 2018/0302335 A1* | 10/2018 | Gao | H04L 43/0876 |
| 2018/0357226 A1* | 12/2018 | Su | G06F 16/214 |
| 2019/0050780 A1* | 2/2019 | Koch | G06F 16/345 |
| 2019/0244129 A1* | 8/2019 | Tabuchi | G06F 9/5033 |
| 2020/0106714 A1* | 4/2020 | Cote | H04L 47/808 |

OTHER PUBLICATIONS

Ahmet C. Baktir, "SDN-Based Multi-Tier Computing and Communication Architecture for Pervasive Healthcare", IEEE Access, accepted Sep. 30, 2018, date of publication Oct. 5, 2018, date of current version Oct. 25, 2018 (Year: 2018).*

Brasington, G., Innovative Compliance Technology Is Empowering End-To-End GRC, Aug. 22, 2018.

* cited by examiner

MINIMIZING COMPLIANCE RISK USING MACHINE LEARNING TECHNIQUES

BACKGROUND

The present embodiments relate to an artificial intelligence platform and an optimization methodology to minimize compliance risk across compliance domains. More specifically, the embodiments relate to understanding and measuring cross-impact between different compliance domains, and leveraging the measurement to minimize compliance risk.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

SUMMARY

The embodiments include a system, computer program product, and method for cross-compliance risk assessment and optimization.

In one aspect, a computer system is provided with a processing unit and memory for use with an artificial intelligence (AI) computer platform to minimize compliance risk across two or more compliance domains. The AI platform utilizes tools in the form of a training manager, a policy manager, and a machine learning manager to support and manage orchestration of compliance activities. The training manager functions to analyze collected compliance data across two or more compliance domains, which also includes inter-domain compliance activity impact and risk probability based on the impact. The policy manager, which is operatively coupled to the training manager, functions to generate a policy based on the calculated risk probability, and more specifically to orchestrate one or more compliance activities based on the generated policy. The machine learning manager functions to dynamically optimize the orchestrated compliance activities, which includes encoding two or more actions to enforce both compliance and mitigation of risk. The processing unit, which is operatively coupled to the AI platform, executes the encoded actions in compliance with the orchestration.

In another aspect, a computer program device is provided to minimize compliance risk across two or more compliance domains. The computer program device is provided with a computer readable storage medium having program code executable by a process to support and enable compliance risk analysis and optimization. Program code is provided to analyze collected compliance data across two or more compliance domains, which also includes inter-domain compliance activity impact and risk probability based on the impact. The program code generates a policy based on the calculated risk probability, and more specifically orchestrates one or more compliance activities based on the generated policy. Program code is provided to dynamically optimize the orchestrated compliance activities, which includes encoding two or more actions to enforce both compliance and mitigation of risk. A processing unit, which is operatively coupled to the computer program device, executes the encoded actions in compliance with the orchestration.

In yet another aspect, a method is provided for compliance risk analysis and optimization across two or more compliance domains. Collected compliance data is analyzed across two or more compliance domains. The analysis includes inter-domain compliance activity impact and risk probability based on the impact. A policy based on the calculated risk probability is generated, and more specifically one or more compliance activities are orchestrated based on the generated policy. The orchestrated compliance activities are dynamically optimized, which includes encoding two or more actions to enforce both compliance and mitigation of risk. A processing unit is provided and executes the encoded actions in compliance with the orchestration.

In a further aspect, a computer system is provided with a processing unit and memory for use with an artificial intelligence (AI) computer platform to minimize compliance risk across two or more compliance domains. The AI platform utilizes tools in the form of a training manager, a policy manager, and a machine learning manager to support and manage orchestration of compliance activities. The training manager functions to collect compliance activity data from at least two compliance domains, and to analyze the collected compliance data, which includes inter-domain compliance activity impact, risk probability, and a reward directed at the risk probability. The policy manager, which is operatively coupled to the training manager, functions to generate a policy based on the calculated risk probability, and more specifically to orchestrate one or more compliance activities based on the generated policy. The machine learning manager functions to dynamically optimize the orchestrated compliance activities, which includes deriving two or more actions to enforce compliance and mitigate risk. The processing unit, which is operatively coupled to the AI platform, executes the encoded actions in compliance with the orchestration.

In yet a further aspect, a computer program device is provided to minimize compliance risk across two or more compliance domains. The computer program device is provided with a computer readable storage medium having program code executable by a process to support and enable compliance risk analysis and optimization. Program code is provided to collect compliance activity data from at least two compliance domains, and to analyze the collected compliance data, which includes inter-domain compliance activity impact, risk probability, and a reward directed at the risk probability. In addition, program code is provided to generate a policy based on the calculated risk probability, and more specifically to orchestrate one or more compliance activities based on the generated policy. Program code is further provided to dynamically optimize the orchestrated compliance activities, which includes deriving two or more actions to enforce compliance and mitigate risk. A processing unit, which is operatively coupled to the computer program device, executes the encoded actions in compliance with the orchestration.

In an even further aspect, a method is provided to minimize compliance risk across two or more compliance domains. Compliance activity data is collected from at least two compliance domains, and subject to analysis, which includes inter-domain compliance activity impact, risk probability, and a reward directed at the risk probability. A policy based on the calculated risk probability is generated, with the policy directed at orchestrating one or more compliance activities based on the generated policy. The orchestrated compliance activities are dynamically optimized, which includes deriving two or more actions to enforce compliance and mitigate risk. A processing unit is provided and executes the encoded actions in compliance with the orchestration.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
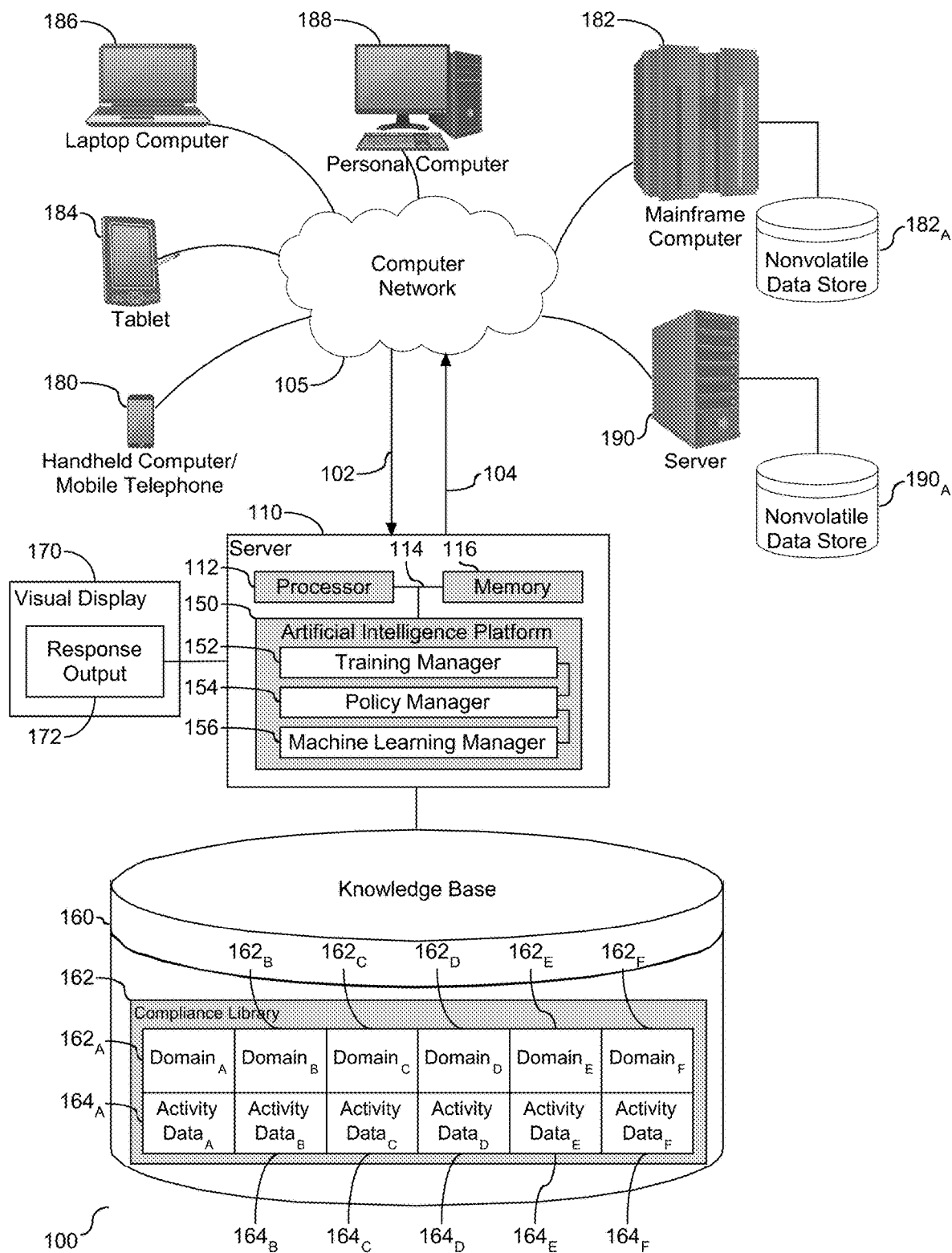
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of information technology (IT), compliance is directed at taking appropriate control of and protecting information, including how the information is obtained and stored, how it is secured, how it is distributed internally and externally, and how data is protected. Internal compliance functions revolve around policies, goals, and organizational structure. External considerations are directed at satisfying a client or end user, while protecting data and internal structures. For example, IT compliance utilizes rule that IT systems should follow to protect an underlying organization or structure. Tools are utilized to identify, monitor, report, and audit corresponding systems and tools to ensure that compliance is maintained. Compliance may include various domains, including, but not limited to, health check, patching operations, system configuration, and security compliance. Accordingly, a compliance domain is directed at a category of internal functions and corresponding functional rules and regulations.

Domains in the IT compliance realm, referred to herein as compliance domains, may operate independently. Compliance domains include health check, patching, operations (change management), system configuration, and security. Similarly, activities in one domain may have an impact on another domain. It is further understood that IT systems are subject to adversarial attacks, which may come in different forms, such as a data breach, unauthorized access to one or more machines, etc. Compliance risk means the risk, e.g. system failure(s), involved when performing compliance activities. Compliance risk measures the extent of vulnerability a system or system component may have with respect to an adversarial attack because they are not adhering to a set of guidelines or policies. A result of such an attack may result in unauthorized access to the system, data breach, etc.

Risk management is directed at mitigating and managing risk through one or more system controls and in one embodiment is an integral aspect of IT compliance. A compliance risk in a particular domain is a measurement directed at vulnerability of the domain. For example, the compliance risk may measure susceptibility of the domain to an adversarial attack because a set of guidelines and policies for the domain are not being followed. Impact of compliance risk for the domain may result in availability of the domain and the underlying system, which may further place data integrity and confidentiality at risk for access.

Risk compliance and assessment has been directed at a measurement on a domain basis. However, it is understood in the field of IT that a risk assessment on one domain may likely have an impact on another domain. This is referred to herein as inter-domain impact. An intelligent system is provided with tools and algorithms to run intelligent real-time analytics using machine learning to minimize compliance risk associated with compliance activities that encompasses inter-domain impact analysis and understanding.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence platform (150) for cognitive computing, including natural language processing and machine learning, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence platform (150) is shown herein configured with tools to understanding cross-impact between different compliance domains. The tools function to estimate a compliance risk, and design an optimization methodology to minimize the compliance risk using machine learning techniques. The tools include, but are not limited to, a training manager (152), a policy manager (154), and a machine learning manager (156). The artificial intelligence platform (150) may receive input from the network (105) and leverage a data source (160), also referred to herein as a corpus or knowledge base, to selectively access compliance activity data. As shown the data source (160) is configured with a compliance library (162) with a plurality of compliance domains. In the example shown herein, the compliance domains include, but are not limited to, domain$_A$ (162$_A$), domain$_B$ (162$_B$), domain$_C$ (162$_C$), domain$_D$ (162$_D$), domain$_E$ (162$_E$), and domain$_F$ (162$_F$). It is understood that there are a variety of categories of compliance domains, including but not limited to, patching activities, compliance activities, change records, remediation reports, event resolution automation, and subject matter experts (SMEs). Corresponding compliance activity data is stored or categorized with respect to each of the compliance domains. Specifically, domain$_A$ (162$_A$) includes activity data$_A$ (164$_A$), domain$_B$ (162$_B$) includes activity data$_B$ (164$_B$), domain$_C$ (162$_C$) includes activity data $_C$ (164$_C$), domain$_D$ (162$_D$) includes activity data $_D$ (164$_D$), domain$_E$ (162$_E$) includes activity data$_E$ (164$_E$), and domain$_F$ (162$_F$) includes activity data$_F$ (164$_F$). In one embodiment, the activity data corresponds to the compliance domains, including patching activity data (164$_A$), compliance activity data (164$_B$), change record data (164$_C$), remediation report data (164$_D$), event resolution automation data (164$_E$), and SME input data (164$_F$). The example domains and corresponding compliance activities shown and described herein are examples and should not be considered limiting.

It is understood that cross-impact analysis leverages data from two or more compliance domains. As shown, the data source (160) is configured with compliance domains and logically grouped compliance activity data. In one embodiment, the compliance activity data may be gathered from the various computing devices (180), (182), (184), (186), (188), and (190) in communication with the network (105). The training manager (152) functions to collect compliance activity data from two or more compliance domains, such as activity data (164$_A$)-(164$_F$) from two or more of compliance domains, such as compliance domains (162$_A$)-(162$_F$), respectively. Using the collected compliance activity data, the training manager (152) conducts an analysis to measure change risk impact across at least two or more of the different compliance domains. The change risk measurement quantifies how each data point impacts another data point. For example, in one embodiment, the training manager (152) may evaluate and/or analyze data from one or more of the compliance domains (162$_A$)-(162$_F$) with respect to one or more corresponding incident tickets, change records, event(s) data generated by a monitoring system, server status and configuration, and application logs. Even though compliance activities may operate independently, it is understood in the art that activity in one compliance domain may impact another compliance domain. Accordingly, the training manager (152) analysis creates a correlation measurement, such as a probability measure, of the cross compliance domain impact.

Using the correlation measurement, the training manager (152) calculates a risk probability, e.g. risk assessment, directed at one or more correlated compliance tasks across two or more of the compliance domains. The following is an example risk impact function employed in the risk assessment:

$$R(\theta,\delta) = \mathbb{E}_\theta L(\theta,\delta(X)) = \int_X L(\theta,\delta(X)) dP_\theta(X)$$

where R represents the risk function, θ represents a fixed (possibly unknown) data point or current state, δ represents a second data point subject to comparison, E represents an expectation over all of the population values of X, L represents a distance function corresponding to Euclidian or vector distance, X represents a vector of observations stochastically drawing from a population, e.g. prior application or server profiles, list of related upgrade actions, versions, etc., and dP$_θ$ is a probability measure over the population values of X parametrized by θ. The integral is evaluated over the population values of X. As shown, the risk assessment quantities a distance between states to measure risk deviation between two points. It is understood that reward is a complementary value to an assessed or quantified risk. In one embodiment, reward is quantified as:

$$\text{Reward} = \text{norm}(1/\text{Risk})$$

Accordingly, the training manager (152) can utilize the assessed risk value to calculate a corresponding reward value.

With the risk probability assessment and the risk reward assessment, the training manager (152) calculates or otherwise creates a transition probability model between compliance activities and correlated compliance tasks, which includes the quantified calculation of risks associated with the correlated task(s). In one embodiment, the training manager (152) organizes the probability model into a risk matrix, an example of which is shown and described in FIG. 2, although other organization forms may be employed, and as such, the matrix should not be considered limiting.

Figure 2:
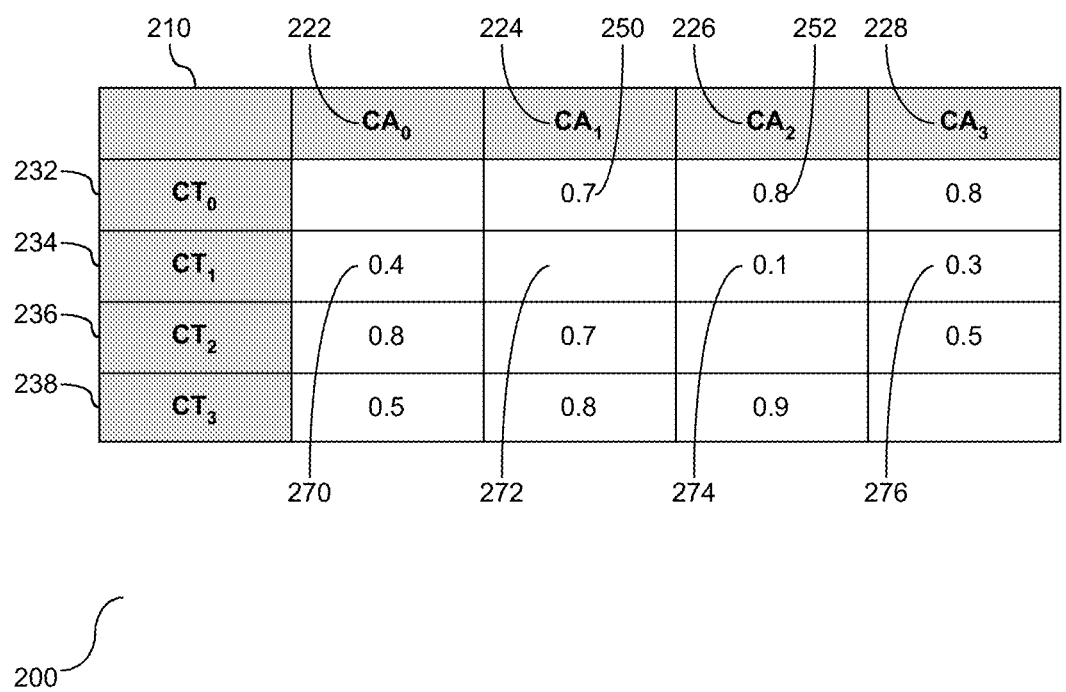
FIG. 2 depicts a block diagram illustrating an example risk matrix.

Referring to FIG. 2, a block diagram (200) is provided to illustrate an example risk matrix (210). As shown, the matrix (210) is a two-dimensional representation with rows and columns. The columns represent compliance activities, and the rows represent compliance tasks. In this example, four compliance activities and four compliance tasks are shown. The compliance activities, CA, are shown and represented as $CA_0$ (222), $CA_1$ (224), $CA_2$ (226), and $CA_3$ (228), and the compliance tasks, CT, are shown and represented as $CT_0$ (232), $CT_1$ (234), $CT_2$ (236), and $CT_3$ (238). Each column in the matrix represents an activity state and each row in the matrix represents a task state. The risk calculation associated with correlated activity and tasks states is shown in the matrix entries. A risk associated with changing activity or tasks states is numerically represented. For example, a change from entry (250) to entry (252) represents a risk increase directed at a compliance activity change for a specific task, $CT_0$ (232).

The analysis conducted by the training manager (152) to create a correlation measurement of the cross compliance domain impact is conducted offline. As shown, the policy manager (154) is operatively coupled to the training manager (152). The policy manager (154) leverages the risk calculation, such that the representation shown in the risk matrix (210), to orchestrate a sequence of actions directed at compliance activities and corresponding compliance tasks. In one embodiment, the policy manager (154) generates a policy in the form of a recommendation of actions and to direct an orchestration of a sequence of actions. In one embodiment, the policy manager (154) is also referred to herein as an orchestrator or a compliance orchestrator. It is understood that the generated policy, e.g. sequence of actions, is used to orchestrate one or more compliance actions to take while minimizing risk.

Example

Referring to the risk matrix (210) shown in FIG. 1, there are four compliance activities represented, including $CA_0$ (222), $CA_1$ (224), $CA_2$ (226), and $CA_3$ (228). In this example, $CA_0$ (222) is an activity associated with memory usage. An event has been generated for high memory usage and application performance degradation and automation is triggered to restart an application. $CA_1$ (224) is an activity for a patch engine to render an engine upgrade. $CA_2$ (226) is an activity associated with performing compliance tasks and is directed to a detecting a non-compliance between the engine and a configuration. $CA_3$ (228) is an activity to change tasks to increase the memory size due to performance degradation of the engine. The policy manager (154) makes a recommendation for a sequence of actions based on the values populated into the matrix by the training manager (152). The recommended sequence shown herein is as follows: (272)→(274)→(276)→(270), with (272) representing the initial compliance activity. If the problem still persists after undertaking the activity at (224), the next recommended activity is (226), and if the problem still persists after undertaking the activity at (226), the next recommended activity is (228), and if the problem still persists after undertaking the activity at (228), the next recommended activity is (222). At shown, the risk for undertaking activity (226) is shown as an increase 0.1, and the risk for undertaking activity (228) from activity (226) increases by a factor of 0.2, and the risk for undertaking activity (222) from activity (228) increases by a factor of 0.1. Accordingly, an example sequence of compliance activities and corresponding actions is provided to demonstrate a sequence of actions.

The assessment(s) and sequencing conducted by the training manager (152) and policy manager (154) may be conducted offline or as one or more background processes. The machine learning manager (156), which is shown herein operatively coupled to the policy manager (154), functions as a tool to dynamically optimize the orchestration, e.g. sequence of actions, created by the policy manager (154). The machine learning manager (156) employs a reinforcement learning algorithm to learn values of states or state histories, and to maximize utility of outcomes. States can involve various different states, including, but not limited to, user state, business states, etc.

As shown herein, the reinforcement learning algorithm employs probability, represented herein as where $M_{ij}^a$ and defined as the probability of reaching state j when taking action a in state i, The ML manager (156) further utilizes an optimization function to support, or in one embodiment as part of, the reinforcement learning algorithm. The following formula represents an optimization function employed in the reinforcement algorithm:

$$U_h([S_0, S_1, \ldots S_N]) = R_0 + U_h([S_1, \ldots S_N])$$

where $U_h$ is a utility function on histories, $R_0$ is a reward value, and S represents compliance activity states. Reinforcement learning pertains to learning values of state or state histories and trying to maximize utility of the outcomes. States can involve various different states, including user state, business state, etc. Policy mapping from states to actions is defined as:

$$\text{Policy}(i) = \arg \max_a \Sigma_j M_{ij}^a U(j)$$

where $M_{ij}^a$ is the probability of reaching state j when taking action a in state i, and the utility function U is defined as:

$$U(i) = R(i) + \max_a \Sigma_j M_{ij}^a U(j)$$

The utility function, U, provides an objective value and data for a path to follow with respect to a path or sequence of compliance actions. Output from the re-enforcement learning algorithm learns values of different states and generates a list of actions to execute to enforce compliance while minimizing risk. Accordingly, the re-enforcement learning shown and described herein dynamically learns values of different states, which may then be applied to minimize risk while enforcing compliance.

The machine learning manager (156) dynamically derives two or more actions to enforce compliance, with the derived actions directed at both minimizing risk and maximizing reward, and that, when executed, enforce compliance. The machine learning manager (156) functions to optimize the orchestrated compliance activities, and specifically the sequence of actions as orchestrated by the policy manager (154).

The machine learning manager (156) enables and supports use of machine learning (ML) with respect to optimization of the compliance activity orchestration. In one embodiment, a corresponding machine learning model (MLM) encapsulates a corresponding ML algorithm. The MLM functions to dynamically learn values of states and state histories as the characteristics of the network and network devices compliance activities and corresponding compliance tasks are subject to change. The ML manager (156) discovers and analyzes patterns, and corresponding risks and rewards. As patterns evolve, the machine learning manager (156) may dynamically orchestrate or amend a sequence of actions, with the sequence documenting, or in one embodiment recommending, compliance activities and tasks to one or more of the network devices. The machine learning manager (156) supports elasticity and the complex characteristics of diverse compliance activities across a plurality of devices in the network. Accordingly, patterns of compliance activity data are learned over time and used for dynamically orchestrating or amending a sequence of compliance activities.

Response output (172) in the form of one or more of the derived actions, such as a sequence of actions or an amended sequence of actions, is communicated or otherwise transmitted to the processing unit (112) for execution. In one embodiment, the response output (172) is communicated to a corresponding network device, shown herein as a visual display (170), operatively coupled to the server (110) or in one embodiment, operatively coupled to one or more of the computing devices (180)-(190) across the network connection (104).

As shown, the network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the artificial intelligence platform (150), with the artificial intelligence platform (150) also including input interfaces to receive requests and respond accordingly.

The knowledge base (160) is configured with logically grouped compliance activities, CAs, (164), and compliance tasks, CTs, (162) for use by the artificial intelligence platform (150). In one embodiment, the knowledge base (160) may be configured with other or additional source of input, and as such, the sources of input shown and described herein should not be considered limiting. Similarly, in one embodiment, the knowledge base (160) includes structured, semi-structured, and/or unstructured content related to compliance activity and compliance tasks. The various computing devices (180)-(190) in communication with the network (105) may include access points for the logically grouped activities and tasks (162). Some of the computing devices may include devices for a database storing the corpus of data as the body of information used by the artificial intelligence platform (150) to generate response output (172) and to communicate the response output to a corresponding network device, such as visual display (170), operatively coupled to the server (110) or one or more of the computing devices (180)-(190) across network connection (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the artificial intelligence platform (150), with the artificial intelligence platform (150) also including one or more input interfaces or portals to receive requests and respond accordingly.

The artificial intelligence platform (150), via a network connection or an internet connection to the network (105), is configured to manage network compliance activity and task maintenance. The artificial intelligence platform (150) may effectively orchestrate or optimize an orchestrated sequence of actions directed at related compliance activity by leveraging the data source (160), which in one embodiment may be operatively coupled to the server (110) across the network (105).

The artificial intelligence platform (150) and the associated tools (152)-(156) leverage the knowledge base (160) to support orchestration of the sequence of actions, and reinforcement learning to optimize the sequence of actions. The policy manager (154) leverages the risk calculation conducted by the training manager (152), and as represented in the risk matrix (210), and orchestrates a sequence of actions directed at compliance activities and corresponding compliance tasks. The machine learning manager (156) functions to optimize the orchestrated compliance activities and the sequence of actions. Accordingly, the tools (152)-(156) mitigate risk by calculating risk associated with correlated actions, orchestrating a sequence, and dynamically optimizing the sequence orchestration.

The network infrastructure is dynamic. It is understood that as the infrastructure is subject to change, compliance activities and corresponding tasks may be subject to change. The machine learning manager (156) is configured to dynamically adjust to such changes, including, but not limited to learning values of states or state histories, and mapping states to actions.

Compliance activity data received across the network (105) may be processed by a server (110), for example IBM Watson® server, and the corresponding artificial intelligence (AI) platform (150). As shown herein, the AI platform (150) together with the embedded manager (152)-(156) performs an analysis of compliance activity data and tasks, orchestrates one or more new compliance activities, as well as dynamically optimizes the orchestration. The function of the tools and corresponding analysis is to embed dynamic reinforcement learning to minimize compliance risk involved in compliance activities. Accordingly, the AI platform (150) evaluates and correlates cross-impact between different compliance domains and designs an optimization to minimize compliance risk.

In some illustrative embodiments, the server (110) may be the IBM Watson® system available from International Business Machines Corporation of Armonk, New York, which is augmented with the mechanisms of the illustrative embodiments described hereafter. The managers (152)-(156), hereinafter referred to collectively as AI tools, are shown as being embodied in or integrated within the artificial intelligence platform (150) of the server (110). The AI tools may be implemented in a separate computing system (e.g., 190), or in one embodiment a system or systems, can they be implemented in two or more connected across network (105) to the server (110). Wherever embodied, the AI tools function to dynamically optimize compliance activities to minimize, or otherwise mitigate, compliance risk.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device (s) and system(s) may take other form factors such as a personal digital assistant (PDA), a gaming device, ATM machine, a portable telephone device, a communication device or other devices that include a processor and memory.

Figure 3:
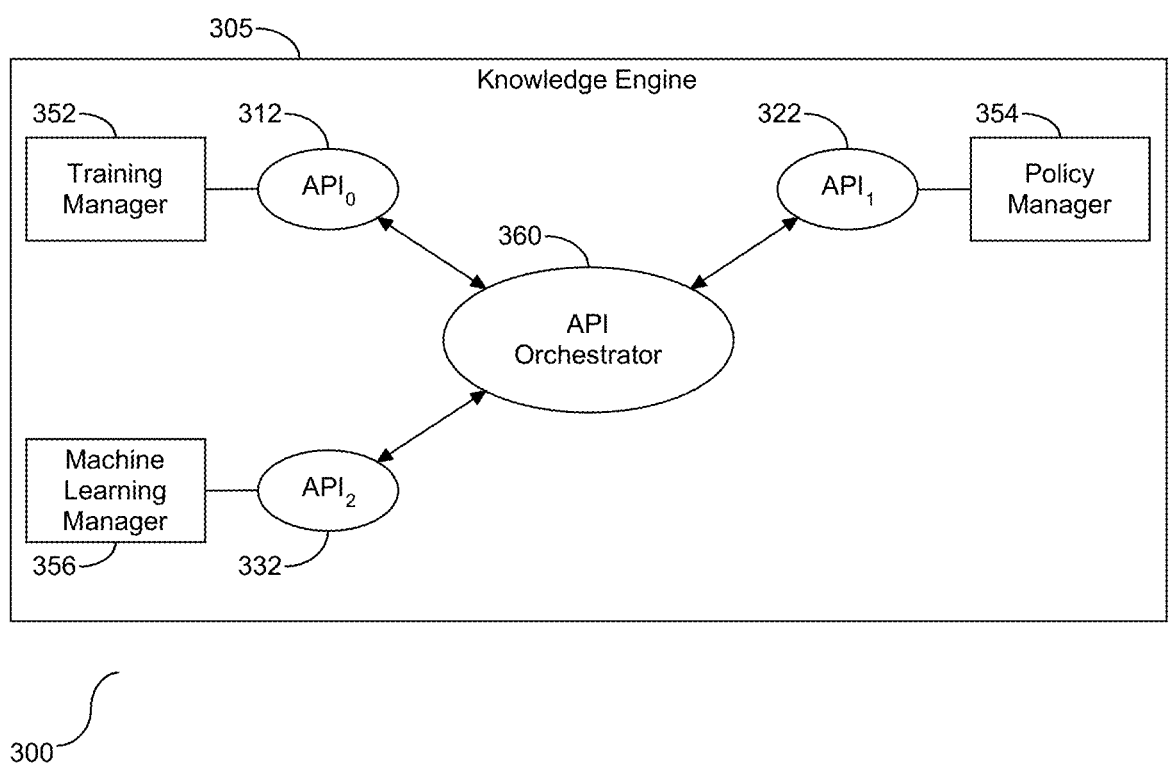
FIG. 3 depicts a block diagram illustrating the artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152)-(156) and their associated functionality. Referring to FIG. 3, a block diagram (300) is provided illustrating the tools (352)-(356) and their associated APIs. As shown, a plurality of tools is embedded within the knowledge engine (305), with the tools including the training manager (152) shown herein as (352) associated with $API_0$ (312), the policy manager (154) shown herein as (354) associated with $API_1$ (322), and the ML manager (156) shown herein as (356) associated with $API_2$ (332). Each of the APIs may be implemented in one or more languages and interface specifications. $API_0$ (312) provides functional support to collect and collate compliance activity data across two or more domains; $API_1$ (322) provides functional support to generate a policy corresponding to the collected and correlated compliance activity data; and $API_2$ (332) provides functional support to dynamically optimize an orchestration of compliance activities to minimize risk and maximize reward. As shown, each of the APIs (312), (322), and (332) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
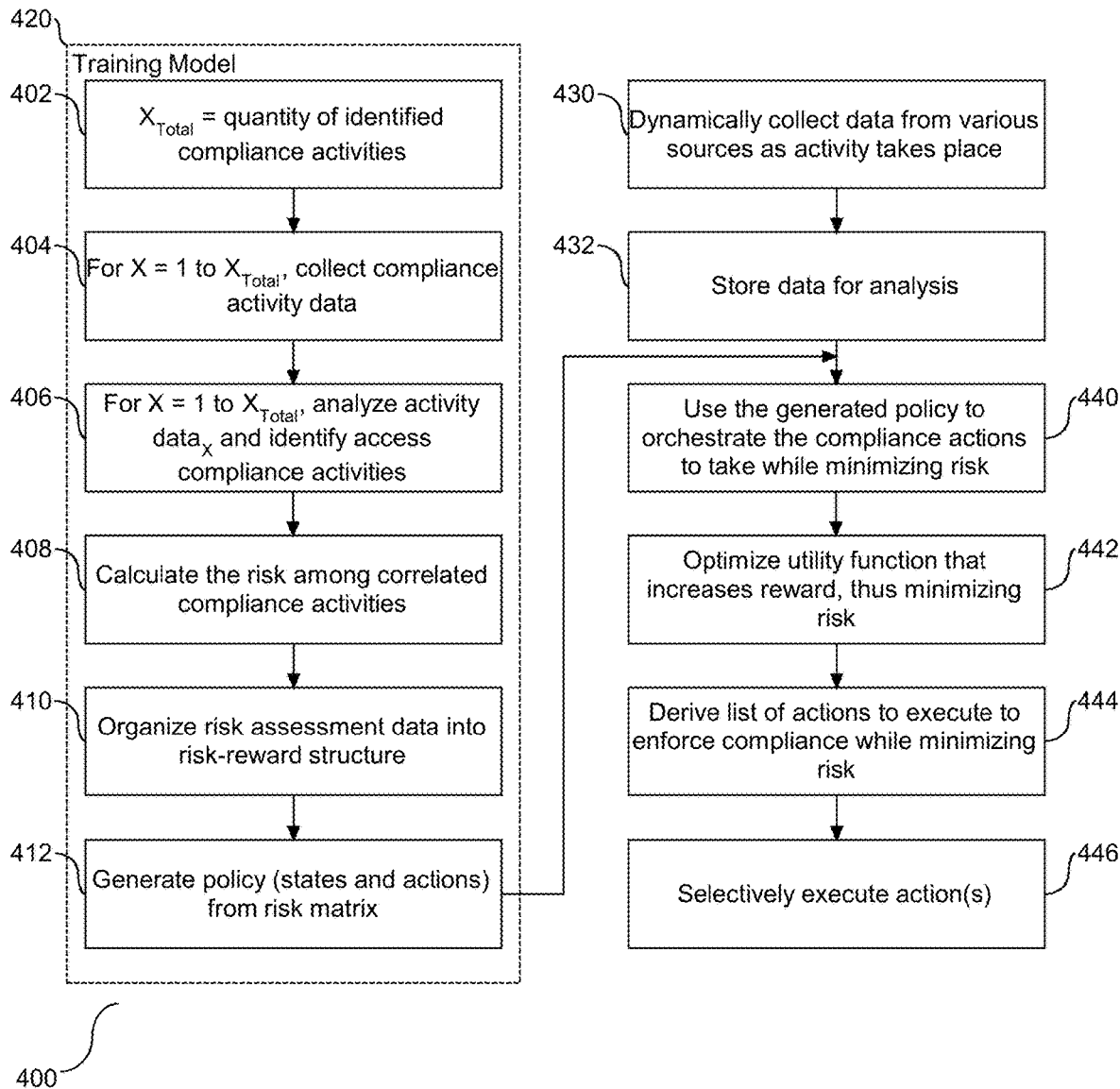
FIG. 4 depicts a flow chart illustrating functionality of compliance orchestration for correlating compliance activities and assessing risk across compliance activities.

Referring to FIG. 4, a flow chart (400) is provided illustrating functionality of compliance orchestration for correlating compliance activities and assessing risk across compliance activities. Data is collected from a plurality of compliance activities. The variable $X_{Total}$ is assigned to the quantity of identified compliance activities (402). Data is collected for each identified compliance activity$_X$, (404). Examples of the activities include, but are not limited to, patching activities, compliance activities, change records, remediation reports, event resolution automation, and subject matter expert (SME) inputs. The compliance activity data shown herein is collected from a plurality of domains, which in one embodiment may operate independently.

The collected data is subject to analysis to identify a correlation across the identified compliance activities (406). It is understood that although different domains may operate independently, activity impact may have an inter-domain impact. The correlation identifies impact across the collected data and determines each data point may impact another data point, and across domains. In one embodiment, the correlation identifies the probability of impact between or across identified compliance activities. Accordingly, compliance data is assessed to identify a relationship or connection across compliance activities.

Following step (406), a risk assessment is conducted to calculate a risk among the correlated compliance activities (408). An example risk impact function is described above in the description of the system in FIG. 1. The risk assessment data is organized into a risk-reward structure (410), which in one embodiment, may be a risk matrix. An example risk matrix is shown and described in FIG. 2, with the values in the structure entries representing a probability of the risk-reward between compliance activities and compliance activity states. A decrease between states represents a decrease in risk with respect to a state of the corresponding compliance activity, and an increase between states represents an increase in the risk with respect to a state of the corresponding compliance activity. Policy, including states, is generated and represented in the risk-reward structure (412), which may be utilized to direct a series of recommended compliance actions, as described in FIG. 1 above with respect to the functionality of the policy manager (154). Accordingly, the risk-reward structure represents a data structure or model for organizing and representing risk-reward values across represented compliance activities and corresponding activity states.

Steps (402)-(412) are referred to herein as a training model (420) to conduct and document risk assessment across identified or known compliance activities. In one embodiment, the risk assessment conducted by the training model is an offline process. Separate from the training model, compliance activity data is dynamically collected from various sources as the activities take place (430) and stored for analysis (432). The training model (420) with the generated policy (412) is leveraged together with the data stored at (432) to orchestrate a series of compliance actions that can be employed while minimizing risk (440). As described in detail in FIG. 1, the generated policy, e.g. sequence of actions, is used to orchestrate one or more compliance actions to take while minimizing risk. The orchestrated compliance actions are represented as an ordered list of recommended actions, e.g. sequence of actions. In one embodiment, the ordered list is introduced with a recommended action that has a low or the lowest risk value as documented in the risk matrix, with sequential actions having increased risk values with the correlated action. Prior to execution of one or more of the compliance actions represented in the ordered list generated at step (440), a reinforcement learning algorithm is invoked by the machine learning manager (156), as described in detail in FIG. 1, to learn values of states or state histories as characteristics of the network and network devices compliance activities. The reinforcement learning algorithm dynamically learns values of the different states, and applies these values to minimize risk while enforcing compliance, and translates these values to optimize the orchestrated list of actions in a manner that increases reward while minimizing risk (442).

An example reinforcement learning algorithm is described above in the description of the system in FIG. 1. It is understood that this is an example learning algorithm, and as such should not be considered limiting. In one embodiment, an alternative learning algorithm may be employed for optimization of the orchestrated list or sequence of actions. Output from the re-enforcement learning algorithm learns values of different states and generates a list of actions to execute to enforce compliance while minimizing risk (444). One or more actions from the generated list are selectively executed to attain a desired level of compliance (446). Accordingly, the re-enforcement learning shown and described herein dynamically learns values of different states, which may then be applied to minimize risk while enforcement compliance.

Embodiments shown and described herein may be in the form of a computer system for use with an intelligent computer platform for providing orchestration of compliance activities across one or more domains to minimize compliance risk. Aspects of the manager (152)-(156) and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the system, tools, and processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
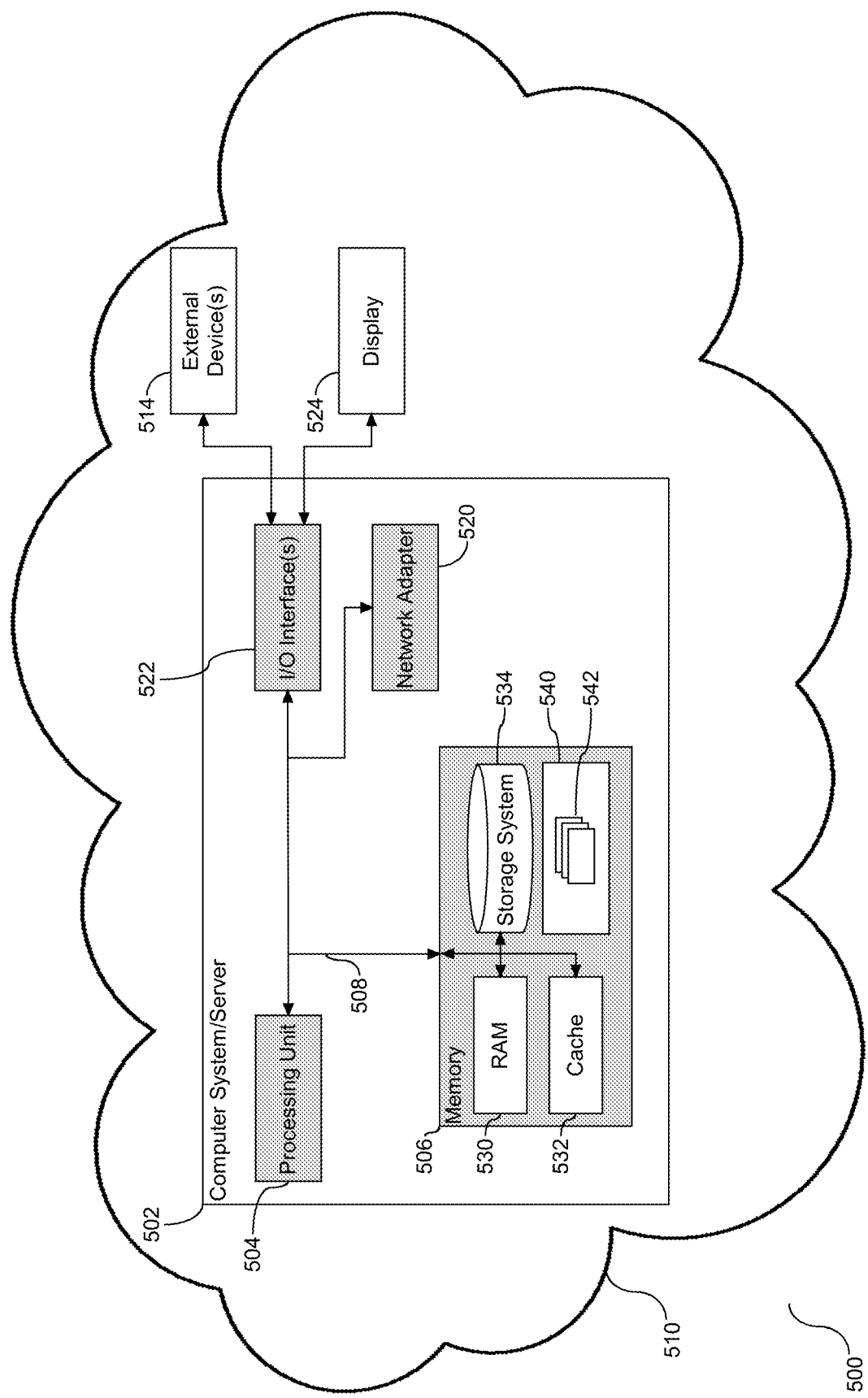
FIG. 5 depicts a block diagram illustrating an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to dynamically orchestrate compliance activities across one or more domains to minimize compliance risk. For example, the set of program modules (542) may include the tools (152)-(156) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
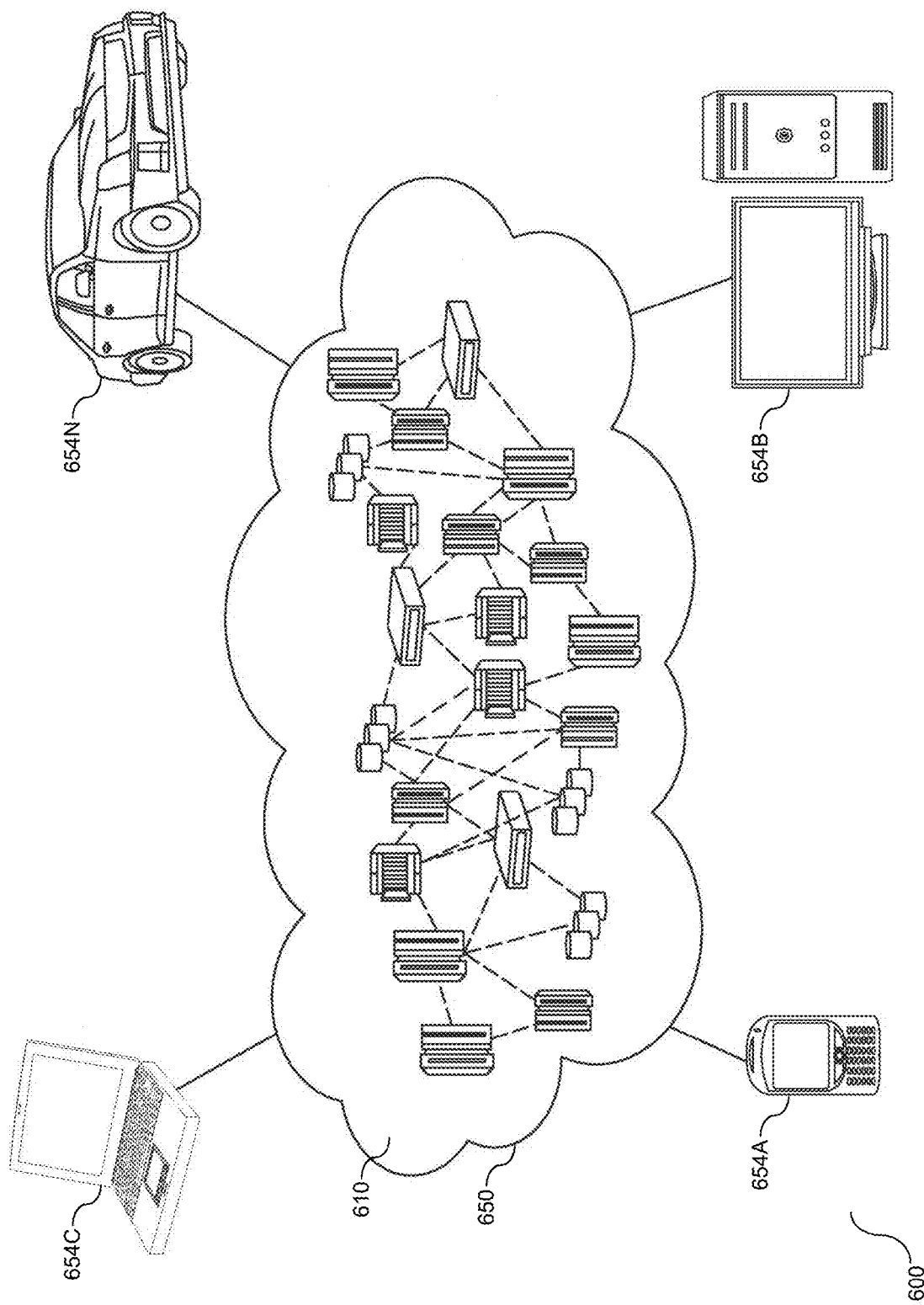
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
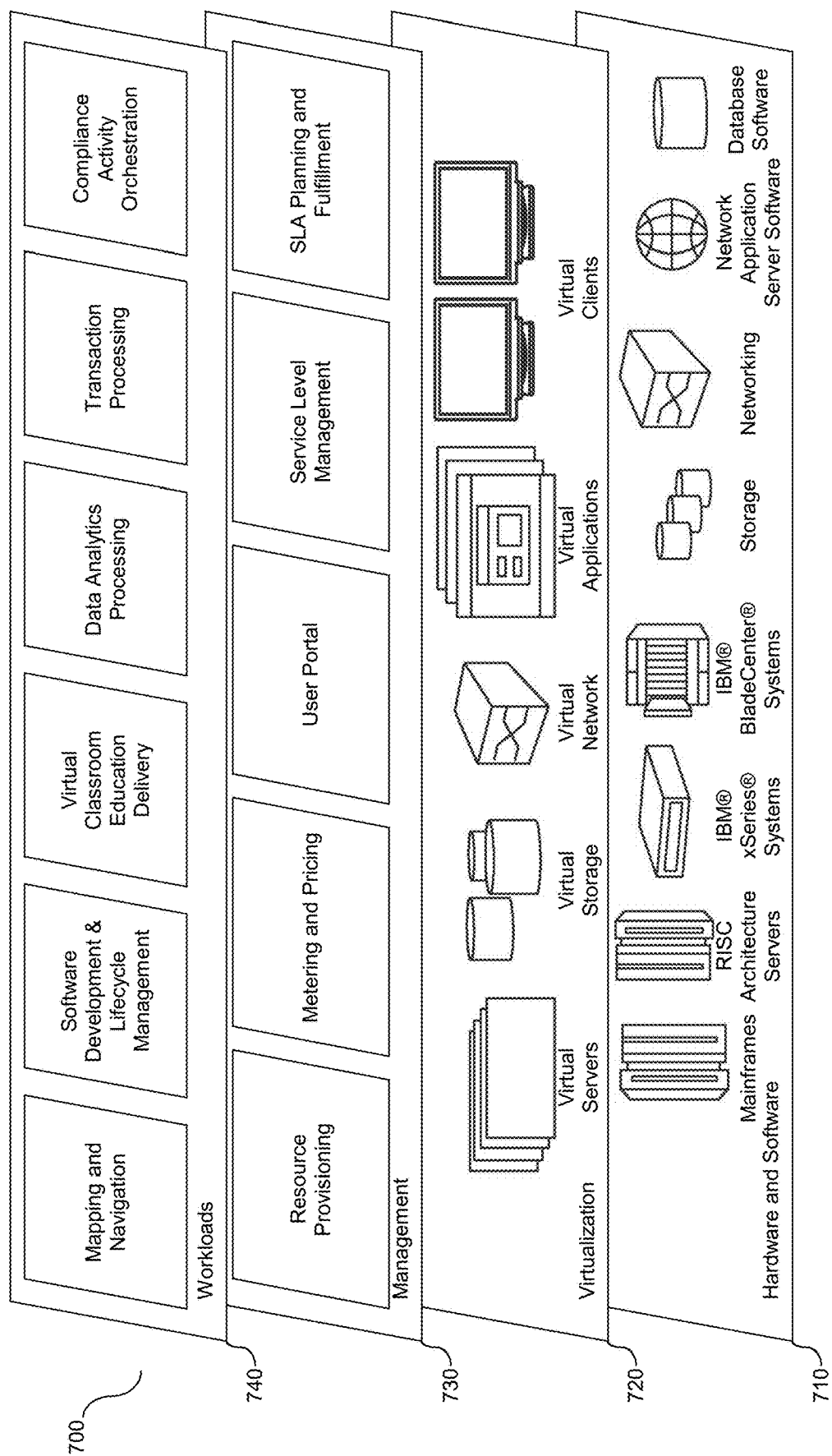
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example systems IBM® zSeries®; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and compliance activity orchestration.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve orchestration of compliance activities.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A system comprising:
  a processing unit operatively coupled to memory;
  an artificial intelligence platform in communication with the processing unit, the platform comprising:
    a training manager to:
      analyze collected compliance data across two or more compliance domains, including measure inter-domain compliance activity impact of two or more compliance activities; and
      calculate risk probabilities based on the measured inter-domain compliance activity impact;
    a policy manager to generate a policy from the calculated risk probabilities, and to orchestrate a sequence of the compliance activities based on the generated policy;
    a machine learning manager to leverage a machine learning model to learn patterns of change to the compliance activities and, as the learned patterns evolve, to dynamically amend the orchestration of the sequence of the compliance activities based on the evolving learned patterns, including encode two or more actions to enforce compliance and mitigate the compliance risk; and
  the processing unit to execute one or more of the encoded actions in compliance with the orchestration of the sequence.

2. The system of claim 1, further comprising the training manager to calculate a reward based on the calculated risk probabilities, and the machine learning manager to leverage the calculation to minimize the compliance risk and maximize the reward across the two or more compliance domains.

3. The system of claim 1, further comprising the training manager to create a transition probability model between the compliance activities and two or more compliance tasks, the model to quantify a risk value for each transition.

4. The system of claim 3, further comprising the policy manager to leverage the quantified risk value for each transition, and to generate an orchestration of a sequence of the actions in consideration of minimizing the compliance risk.

5. The system of claim 4, further comprising the machine learning manager to dynamically optimize the orchestration of the sequence, including to identify and encode the sequence of the compliance activities.

6. The system of claim 5, further comprising the processing unit to selectively execute the encoded actions in compliance with the orchestration of the sequence, wherein the selective execution is subject to persistence of a problem.

7. The system of claim 1, further comprising the machine learning manager to dynamically learn one or more state values and one or more state histories as a characteristic of device compliance activity data are subject to change.

8. A computer program product comprising:
  a computer readable storage medium having program code embodied therewith, the program code executable by a processor to:
    analyze collected compliance data across two or more compliance domains, including measure inter-domain compliance activity impact of two or more compliance activities; and
    calculate risk probabilities based on the measured inter-domain compliance activity impact;
    generate a policy from the calculated risk probabilities, and orchestrate a sequence of the compliance activities based on the generated policy; and
    leverage machine learning to learn patterns of change to the compliance activities and, as the learned patterns evolve, dynamically amend the orchestration of the sequence of the compliance activities based on the evolving learned patterns, including encode two or more actions to enforce compliance and mitigate the compliance risk; and
  a processing unit to execute one or more of the encoded actions in compliance with the orchestration of the sequence.

9. The computer program product of claim 8, further comprising program code to calculate a reward based on the calculated risk probabilities and the dynamic optimization adjustment of the sequence of the compliance activities to leverage the calculation to minimize the compliance risk and maximize the reward.

10. The computer program product of claim 8, further comprising program code to create a transition probability model between the two or more compliance activities and two or more compliance tasks, the model to quantify a risk value for each transition.

11. The computer program product of claim 10, further comprising program code to leverage the quantified risk value for each transition, and to generate an orchestration of a sequence of the actions in consideration of minimizing the compliance risk.

12. The computer program product of claim 11, further comprising program code to dynamically optimize the orchestration of the sequence, including to identify and encode the sequence of the compliance activities.

13. The computer program product of claim 12, further comprising program code to selectively execute the encoded actions in compliance with the orchestration of the sequence, wherein the selective execution is subject to persistence of a problem.

14. The computer program product of claim 8, further comprising program code to dynamically learn one or more state values and one or more state histories as a characteristic of device compliance activity data are subject to change.

15. A method comprising:
  analyzing collected compliance data across two or more compliance domains, including measuring inter-domain compliance activity impact of two or more compliance activities and calculating risk probabilities based on the measured inter-domain compliance activity impact;
generating a policy from the calculated risk probabilities, and orchestrating a sequence of the compliance activities based on the generated policy;
leveraging machine learning to learn patterns of change to the compliance activities and, as the learned patterns evolve, dynamically amending the orchestration of the sequence of the compliance activities based on the evolving learned patterns, including encoding two or more actions to enforce compliance and mitigate the compliance risk; and
executing, by a processing unit, one or more of the encoded actions in compliance with the orchestration of the sequence.

16. The method of claim 15, further comprising calculating a reward based on the calculated risk probabilities, and leveraging the calculation to minimize the compliance risk and maximize the reward.

17. The method of claim 15, further comprising creating a transition probability model between the two or more compliance activities and two or more compliance tasks, the model quantifying a risk value for each transition.

18. The method of claim 17, further comprising leveraging the quantified risk value for each transition, and generating an orchestration of a sequence of the actions in consideration of minimizing the compliance risk.

19. The method of claim 18, further comprising dynamically optimizing the orchestration of the sequence, including identifying and encoding the sequence of the compliance activities.

20. The method of claim 19, further comprising selectively executing the encoded actions in compliance with the orchestration of the sequence, wherein the selective execution is subject to persistence of a problem.

21. The method of claim 15, further comprising dynamically learning one or more state values and one or more state histories as a characteristic of device compliance activity data are subject to change.

22. A system comprising:
a processing unit operatively coupled to memory;
an artificial intelligence platform in communication with the processing unit, the platform comprising:
  a training manager to:
    collect compliance activity data from two or more compliance domains;
    analyze and correlate the collected compliance activity data, including measure change risk impact of two or more new compliance activities across the two or more compliance domains;
    calculate risk probabilities directed at correlated actions across the two or more compliance domains, and to calculate a reward directed at the calculated risk probabilities;
  a policy manager to generate a policy from the calculated risk probabilities, and to orchestrate a sequence including the new compliance activities based on the generated policy; and
  a machine learning manager to leverage a machine learning model to learn patterns of the new compliance activities and, as the learned patterns evolve, to dynamically optimize the orchestration of the sequence of the new compliance activities based on the evolving learned patterns, wherein the dynamic optimization of the orchestration of the sequence of the new compliance activities minimizes the compliance risk and maximizes the reward, and derives two or more actions to enforce compliance and mitigate the compliance risk;
the processing unit to execute one or more of the derived actions.

23. A computer program product comprising:
a computer readable storage medium having program code embodied therewith, the program code executable by a processor to:
  collect compliance activity data from two or more compliance domains;
  analyze and correlate the collected compliance activity data, including measure change risk impact of two or more new compliance activities across the two or more compliance domains;
  calculate risk probabilities directed at correlated actions across the two or more compliance domains, and calculate a reward directed at the calculated risk probabilities;
  generate a policy from the calculated risk probabilities, including the program code to orchestrate a sequence including the new compliance activities based on the generated policy; and
  leverage machine learning to learn patterns of the new compliance activities and, as the learned patterns evolve, to dynamically optimize the orchestration of the sequence of the new compliance activities based on the evolving learned patterns, wherein the dynamic optimization of the orchestration of the sequence of the new compliance activities minimizes the compliance risk and maximizes the reward, and derives two or more actions to enforce compliance and mitigate risk; and
the processing unit to execute one or more of the derived actions.

24. A method comprising:
collecting compliance activity data from two or more compliance domains;
analyzing and correlating the collected compliance activity data, including measuring change risk impact of two or more new compliance activities across two or more different compliance domains;
calculating a risk probabilities directed at correlated actions across the two or more compliance domains, and calculating a reward directed at the calculated risk probabilities;
generating a policy from the calculated risk probabilities, including orchestrating a sequence including the new compliance activities based on the generated policy; and
leveraging a machine learning algorithm to learn patterns of the new compliance activities and, as the learned patterns evolve, dynamically optimize the orchestration of the sequence of the new compliance activities based on the evolving learned patterns, wherein the dynamic optimization of the orchestration of the sequence of the new compliance activities minimizes the compliance risk and maximizes the reward, and derives two or more actions to enforce compliance and mitigate risk; and
the processing unit to execute one or more of the derived actions.

* * * * *